United States Patent
Wang

(10) Patent No.: US 11,609,876 B1
(45) Date of Patent: Mar. 21, 2023

(54) USB MULTIPLEXING SINGLE-WIRE INTERFACE UNIT, CHIP AND COMMUNICATION SYSTEM

(71) Applicant: NANJING QINHENG MICROELECTRONICS CO., LTD., Nanjing (CN)

(72) Inventor: Chunhua Wang, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 17/823,529

(22) Filed: Aug. 31, 2022

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 2012/0203937 A1* | 8/2012 | Mohanty | G06F 13/12 710/33 |
| 2013/0326094 A1* | 12/2013 | Yu | G06F 13/4072 710/15 |
| 2015/0227485 A1* | 8/2015 | Maung | G06F 13/4022 710/316 |
| 2015/0324313 A1* | 11/2015 | Lin | G06F 11/3051 710/104 |
| 2019/0332152 A1* | 10/2019 | Hunt | G06F 13/4282 |
| 2020/0151129 A1* | 5/2020 | Wright | G06F 13/4022 |

FOREIGN PATENT DOCUMENTS

| | | |
|---|---|---|
| CN | 102546869 A | 7/2012 |
| CN | 103853689 A | 6/2014 |
| CN | 104731746 A | 6/2015 |
| CN | 106654770 A | 5/2017 |

\* cited by examiner

*Primary Examiner* — Henry Tsai
*Assistant Examiner* — Harry Z Wang
(74) *Attorney, Agent, or Firm* — CBM Patent Consulting, LLC

(57) ABSTRACT

An USB multiplexing single-wire interface unit comprises a D+ pin, a D− pin, a control bit register for USB and single-wire interface modes and a USB controller, the USB controller comprises an EOP detection module and a single-wire interface EOP detection module. The USB mode or the single-wire interface mode is selected according to mode identification of the control bit register for USB and single-wire interface modes, an output of the EOP detection module is selected as a USB EOP trigger signal in the USB mode, and an output of the single-wire interface EOP detection module is selected as a USB EOP trigger signal in the single-wire interface mode.

10 Claims, 6 Drawing Sheets

US 11,609,876 B1

USB MULTIPLEXING SINGLE-WIRE INTERFACE UNIT, CHIP AND COMMUNICATION SYSTEM

CROSS REFERENCES

This application claims priority to Chinese Patent Application Ser. No. CN2022105440958 filed on 16 May 2022.

TECHNICAL FIELD

The present invention belongs to the design field of integrated circuits, and more particularly, to a MCU chip with a built-in USB controller.

BACKGROUND

When a MCU (Single-Chip Microcontroller and microcontroller) carries out inter-chip communication with a peripheral chip such as a sensor chip or another MCU chip, 4-wire SPI, 2-wire asynchronous serial, 2-wire IIC and 10-wire parallel port solutions are commonly used at present. The SPI and the parallel port have a high rate but occupy more IO pins, while the serial port and the IIC occupy two IO pins but have a rate usually lower than 3 Mbps. In addition, there are a plurality of single-wire interfaces with different protocols and a rate as low as 100 Kbps. All the inter-chip communication interfaces above only contain a simple physical layer or bit format specification, without a data integrity detection mechanism such as CRC and a communication reliability mechanism such as automatic retry in case of a communication error.

USB is essentially a communication bus between devices for connecting a computer with a keyboard, a printer and other devices, has mature physical layer specification and communication protocol, and has extension mechanisms such as CRC, automatic retry and bus address allocation. Currently, most 32-bit MCUs are internally provided with a 12 Mbps full-speed USB controller, and some 8-bit MCUs are also internally provided with a USB controller. At present, the USB may be used not only for communication between devices, but also for communication between chips. However, for small-sized MCUs with fewer packaged pins, the USB still occupies two IO pins, which does not save the pins compared with the serial port and the IIC.

SUMMARY

Object of the present invention: To solve the problems in the prior art that inter-chip communication cannot simultaneously realize high communication rate, occupy few pins, and have a data integrity detection mechanism and a communication reliability mechanism, the present invention provides a USB multiplexing single-wire interface unit, a chip and a communication system.

Technical solutions: a USB multiplexing single-wire interface unit comprises:

a D+ pin and a D− pin of a USB;

a control bit register for USB and single-wire interface modes, configured for storing mode identifications, wherein the mode comprises the USB mode and the single-wire interface mode; and a USB controller, comprising an EOP detection module and a single-wire interface EOP detection module, wherein an input end of the EOP detection module is connected with the D+ pin and the D− pin, and an input end of the single-wire interface EOP detection module is connected with the D+ pin; and output ends of the EOP detection module and the single-wire interface EOP detection module output a USB EOP trigger signal;

the USB controller being configured for determining the USB EOP trigger signal according to the mode identification, running the USB mode when the mode identification is the USB mode, and selecting an output of the EOP detection module as the USB EOP trigger signal, and the USB controller controlling output enable of the D+ pin and the D− pin; and running the single-wire interface mode when the mode identification is the single-wire interface mode, and selecting an output of the single-wire interface EOP detection module as the USB EOP trigger signal, and the USB controller only controlling the output enable of the D+ pin and not controlling the output enable of the D− pin.

Further, the USB controller further comprises a USB bus reset detection module and a single-wire interface bus reset detection module, an input end of the USB bus reset detection module is connected with the D+ pin and the D− pin, and an input end of the single-wire interface bus reset detection module is connected with the D+ pin; and output ends of the USB bus reset detection module and the single-wire interface bus reset detection module output a bus reset signal or a USB device unplugging signal; and the USB controller is configured for determining the bus reset signal or the USB device unplugging signal according to the mode identification, and selecting an output signal of the USB bus reset detection module as the bus reset signal or the USB device unplugging signal in the USB mode; and selecting an output of the single-wire interface bus reset detection module as the bus reset signal or the USB device unplugging signal in the single-wire interface mode.

Further, the single-wire interface EOP detection module outputs a valid signal when detecting that a preset signal appears in a signal of the D+ pin.

Further, the preset signal is one or two of the following signals:

a signal comprising a token-type PID, 2 bytes of data and a low level with a width of 2 data bits in turn; and a signal comprising a high level with a width of more than 7 consecutive data bits.

Further, the preset signal is one or two of the following signals:

a signal comprising a token-type PID, 2 bytes of data and a low level with a width of 2 data bits in turn; and a signal comprising a low level with a width of 2 data bits and a high level with a width of more than 7 consecutive data in turn.

Further, in the single-wire interface mode, when the single-wire interface bus reset detection unit detects a low level with a width of more than 24 consecutive data bits, the bus reset signal is output for a USB device mode, and the USB device unplugging signal is output for a USB host mode.

Further, input bit data of the USB controller to a physical layer is determined according to the mode identification, when the mode identification is the USB mode, a differential signal of the D+ pin and the D− pin is selected as input bit data of the physical layer; and when the mode identification is the single-wire interface mode, a level signal of the D+ pin is selected as the input bit data of the physical layer.

Further, the USB controller selects the USB EOP trigger signal by a selector or a circuit equivalent to selection logic.

A chip comprises the USB multiplexing single-wire interface unit above, a microprocessor core and a system bus, wherein the microprocessor core is connected with the system bus, and the USB controller in the USB multiplexing single-wire interface unit is connected onto the system bus.

A communication system comprises at least a first chip and a second chip, wherein the first chip and the second chip are both the chip above, a USB controller of the first chip works in a USB host function mode, a USB controller of the second chip works in a USB device function mode, a D+ pin of the first chip is connected with a D+ pin of the second chip, and a D− pin of the first chip is not connected with a D− pin of the second chip.

Compared with the prior art, the USB multiplexing single-wire interface unit, the chip and the communication system provided by the present invention can realize high communication rate, less occupied pins, have a data integrity monitoring mechanism and a communication reliability mechanism at the same time, and specifically comprise the following beneficial effects:

(1) A implementation cost is low. The existing USB controllers, pins and other related resources are multiplexed, and only a few modules such as the single-wire interface EOP detection module and the selection function unit are added. Compared with a scale of thousands or even tens of thousands of digital circuits of the existing USB controllers, a scale of the digital circuits increased is no more than 2%, and there is no need to add analog circuits and IO pins at all, which can be multiplexed directly. In addition to the USB, a MCU chip usually has a larger area microprocessor core, program ROM, data RAM, other interface peripherals and pins, and all USB accounts for less than 5% of the whole chip. Therefore, compared with the whole chip, an increase of chip area caused by adding new modules in the solution of the present invention is less than 0.1%.

(2) A communication rate is high. 12 Mbps is supported by default, which is several times higher than the serial port and IIC, and dozens of times higher than other single-wire interfaces, and is at the same level as the SPI. The rate of the single-wire interface of the present invention can also be further increased by improving a clock frequency.

(3) Pins are saved. Only one pin is occupied. When working in the single-wire interface mode, the D− pin may be used for other TO purposes. 75% pins are saved compared with the SPI, and 50% pins are saved compared with the serial port and IIC.

(4) Protocols are uniform and mature. Compared with other single-wire interfaces, the single-wire interface of the present invention reuses the mature architecture of USB, and has rich application ecology, low learning cost and quick introduction for application development engineers; the protocols are uniform, and no compatibility problems are caused when the protocols are interconnected; bus extension is supported; and dynamic connection and disconnection are supported. However, the interfaces such as serial port and IIC do not consider supporting dynamic connection and disconnection according to the specifications thereof.

(5) The communication is reliable. Compared with the existing common communication interfaces between chips, the single-wire interface of the present invention has the data integrity detection mechanism as well as the communication reliability mechanism and edge rate control realized by hardware, while other interfaces do not support edge rate control, and usually require software to realize CRC and retry, which not only occupies more code space, but also occupies the running time of the MCU core.

DETAILED DESCRIPTION

The present invention will be further described below with reference to the accompany drawings and specific embodiments.

First Embodiment

Figure 1:
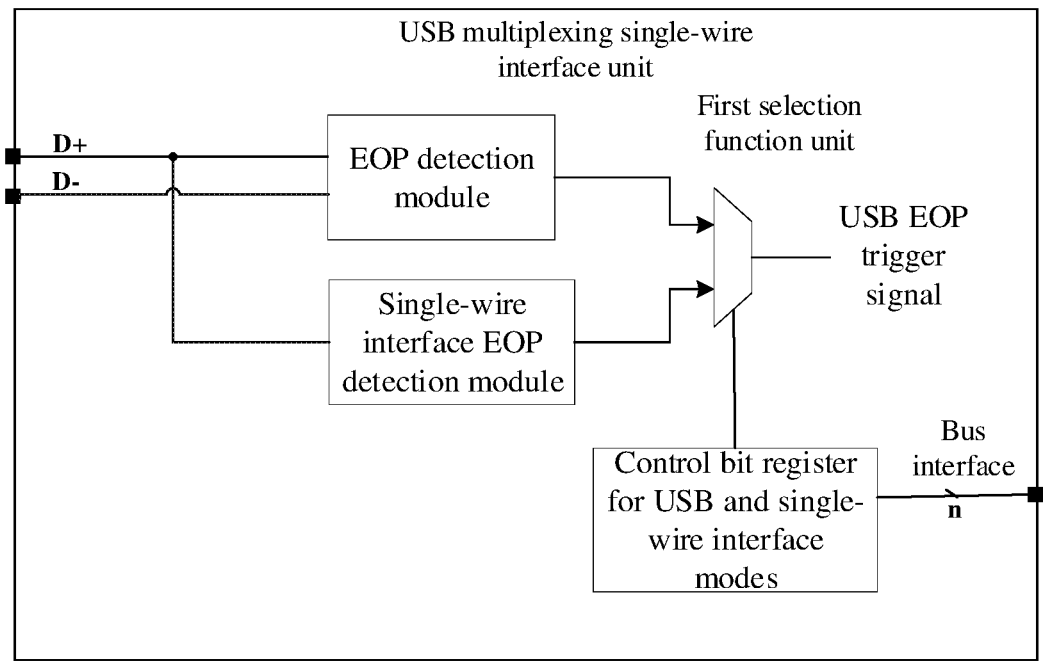
FIG. 1 is a schematic structural diagram of a USB multiplexing single-wire interface unit according to a first embodiment.

A USB multiplexing single-wire interface unit, as shown in FIG. 1, comprises:

a D+ pin and a D− pin of a USB;

a control bit register for USB and single-wire interface modes, configured for storing mode identifications, wherein the mode comprises the USB mode and the single-wire interface mode; and a USB controller, comprising an EOP detection module and a single-wire interface EOP detection module, wherein an input end of the EOP detection module is connected with the D+ pin and the D− pin, and an input end of the single-wire interface EOP detection module is connected with the D+ pin; and output ends of the EOP detection module and the single-wire interface EOP detection module output a USB EOP trigger signal. The USB controller further comprises a plurality of modules such as a bit stuffing module, a bit decoding module, a bit encoding module, a packet state machine, a connection-disconnection state machine, and the like.

The USB controller selects which signal is used as a USB EOP trigger signal according to mode identification. For this selection function, in the process of digital design source code and structure design, a first selection function unit may be set, and the first selection function unit may be realized by a selector or a structure equivalent to selection logic or other module with the same function. However, the first selection function unit in the source code or structure has greatly reduced a scale of a digital circuit (similar to the process of merging similar items, converting to a simpler equivalent circuit and an object code) after being compiled by a digital circuit EDA tool, and may eventually realize the selection function equivalent to the above, but there may not be an independent selection unit in a physical circuit. Moreover, an EOP detection module and a single-wire interface EOP detection module in the source code and structure may be partially merged and shared with some physical circuit units to save the hardware cost (just the function of the EDA tool). However, there are still two modules with the same functions as above in macro structure and technical principle.

The following is the specific implementation process of the first selection function unit in the process of digital design source code and structure design: an input end of the first selection function unit is respectively connected with output ends of the EOP detection module and the single-wire interface EOP detection module, a control end of the first selection function unit is connected with the control bit register for USB and single-wire interface modes, and an output end of the first selection function unit outputs the USB EOP trigger signal.

The first selection function unit is configured for determining the USB EOP trigger signal according to the mode identification, running the USB mode when the mode identification is the USB mode, and selecting an output of the EOP detection module as the USB EOP trigger signal, and the USB controller controls output enable of the D+ pin and the D− pin; and running the single-wire interface mode when the mode identification is the single-wire interface mode, and selecting an output of the single-wire interface EOP detection module as the USB EOP trigger signal, and the USB controller only controls the output enable of the D+ pin and does not control the output enable of the D-pin.

Figure 2:
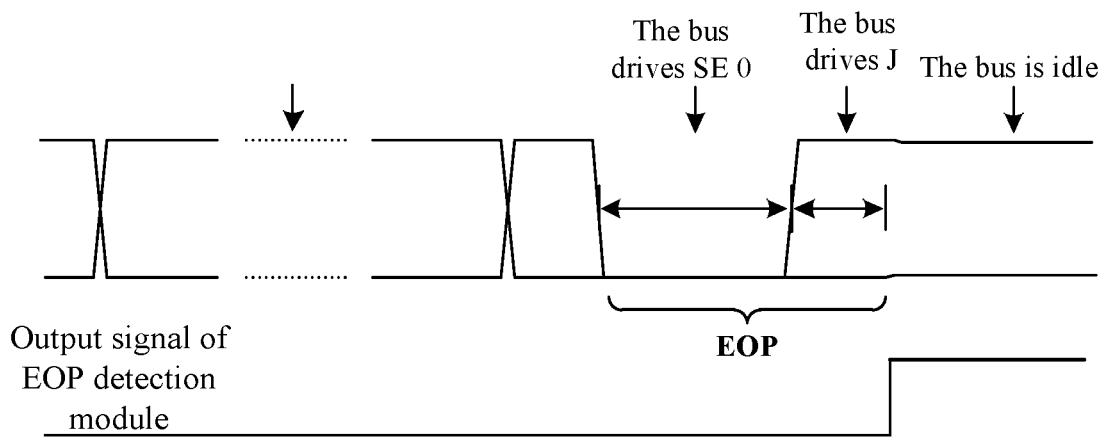
FIG. 2 shows a generation process of a valid signal of an EOP detection module according to the first embodiment.

The generation of an output signal of the EOP detection module is shown in FIG. 2. By detecting signals of the D+ pin and the D− pin, when an End of packet (EOP) signal does not appear, the output signal of the EOP detection module is invalid (taking the low level in the figure as an example), which does not trigger the EOP; when the EOP signal appears, the EOP detection module outputs a valid signal (taking the high level in the figure as an example), which triggers the EOP.

An output signal of the single-wire interface EOP detection module is generated by detecting the signal of the D+ pin, when a preset signal does not appear, the output signal of the EOP single-wire interface EOP detection module is invalid (taking the low level in the figure as an example), which does not trigger the EOP; when the preset signal appears, the single-wire interface EOP detection module outputs a valid signal (taking the high level in the figure as an example), which triggers the EOP. A time correlation of the signals in the figure is only an example. In fact, the single-wire interface EOP detection module may output a valid signal immediately after the preset signal, and may also output the valid signal by delaying several clocks after the preset signal. However, no matter which way the valid signal is output, it is necessary to be agreed with a subsequent module in the USB controller that uses this signal, so as to perceive the EOP. This belongs to the common sense of designers in this field. This specification is mainly about the technical principle and architecture innovation, and does not limit such specific implementation, nor does it limit a large number of other modules that the USB controller should have.

Figure 3:
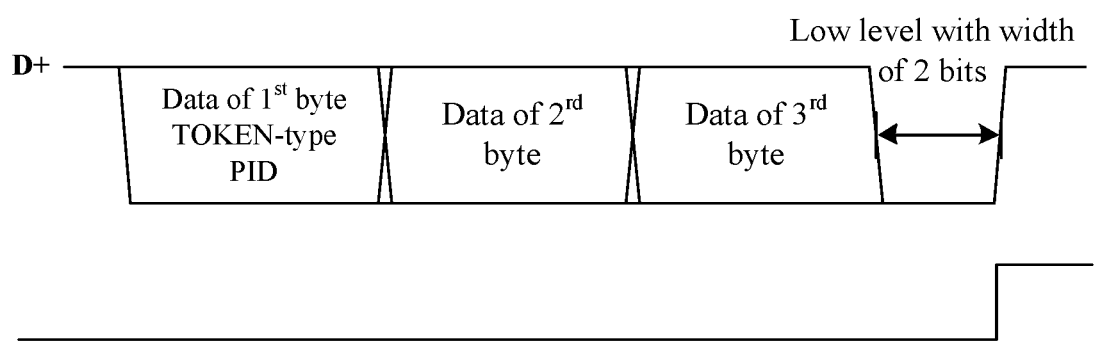
FIG. 3 shows a generation process of a valid signal of a single-wire interface EOP detection module according to the first embodiment.
Figure 4:
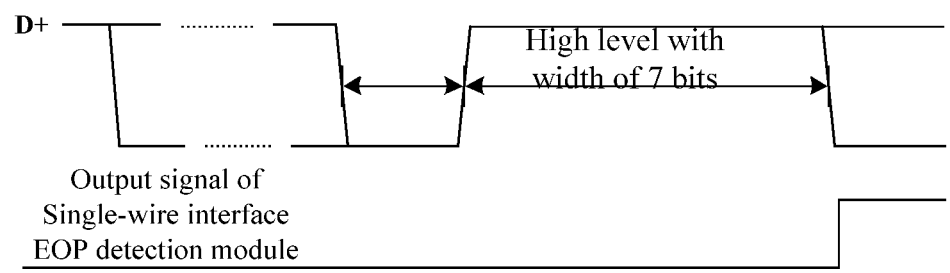
FIG. 4 shows another generation process of the valid signal of the single-wire interface EOP detection module according to the first embodiment.

The preset signal is one or two of the following signals S1 and S2:

S1: as shown in FIG. 3, comprising a token-type PID, 2 bytes of data and a low level with a width of 2 data bits in turn; and S2: as shown in FIG. 4, comprising a low level with a width of 2 data bits and a high level with a width of more than 7 (comprising 7) consecutive data in turn; For simplification, S2 may also be directly preset as a signal comprising a high level with a width of more than 7 consecutive data with reference to a state of the packet state machine of the USB controller at current.

Input bit data of the USB controller to a physical layer is determined according to the mode identification, when the mode identification is the USB mode, a differential signal of the D+ pin and the D− pin is selected as input bit data of the physical layer; and when the mode identification is the single-wire interface mode, a level signal of the D+ pin is selected as the input bit data of the physical layer.

Second Embodiment

On the basis of the first embodiment, related improvements of a bus reset signal and a USB device unplugging signal are added to the second embodiment.

Figure 5:
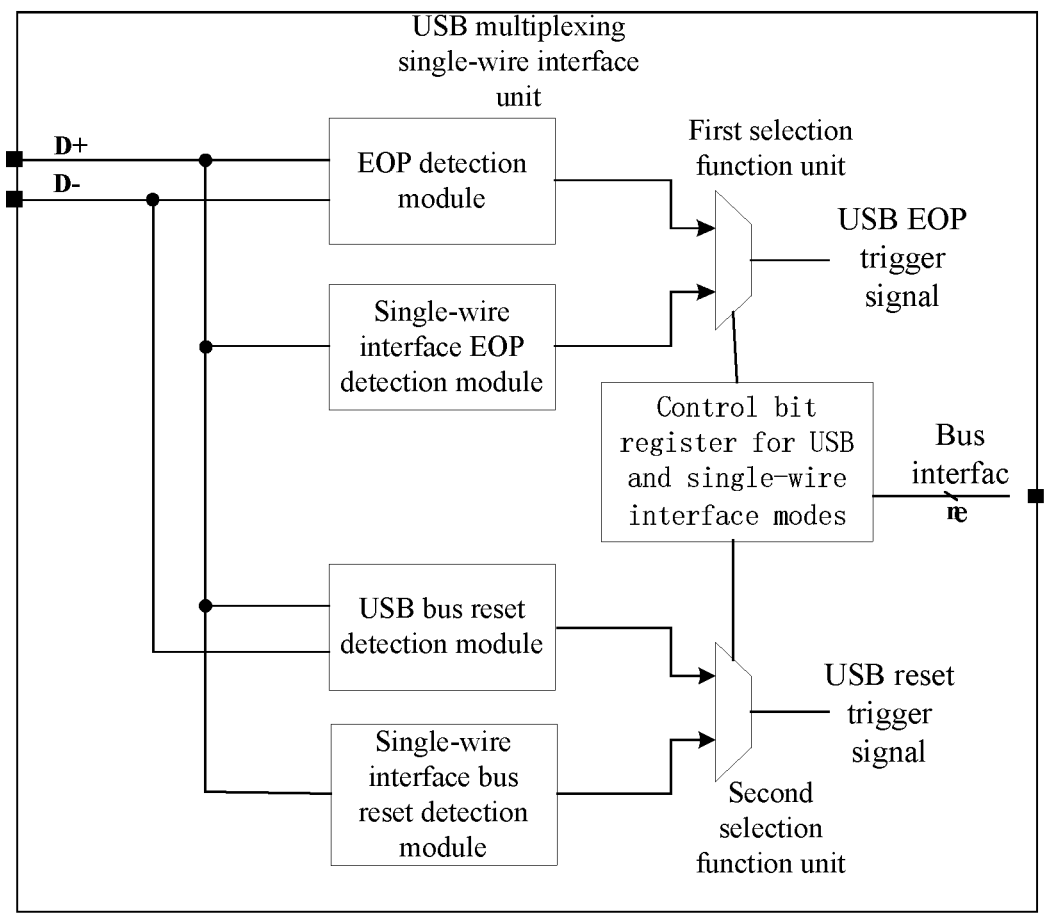
FIG. 5 is a schematic structural diagram of a USB multiplexing single-wire interface unit according to a second embodiment of the present invention.

As shown in FIG. 5, the USB controller further comprises a USB bus reset detection module and a single-wire interface bus reset detection module in addition to comprising various modules in the first embodiment, an input end of the USB bus reset detection module is connected with the D+ pin and the D− pin, and an input end of the single-wire interface bus reset detection module is connected with the D+ pin; and output ends of the USB bus reset detection module and the single-wire interface bus reset detection module output a bus reset signal or a USB device unplugging signal. If the chip is in a host function mode, the output signal is the bus reset signal, and if the chip is in a device function mode, the output signal is the USB device unplugging signal.

Similar to the principle of the first selection function unit in the first embodiment, in the second embodiment, a second selection function unit may be added in the digital design source code and structure design. There are multiple specific ways to realize the second selection function unit, which is not limited here. The second selection function unit may be realized by a selector or an AND logic gate or other modules with the same function. However, there may not be an independent selection unit after compilation, and the USB bus reset detection module and the single-wire interface bus reset detection module may also merge and share some physical circuit units.

The following is the specific implementation process of the second selection function unit in the process of digital design source code and structure design: an input end of the second selection function unit is respectively connected with output ends of the USB bus reset detection module and the single-wire interface bus reset detection module, a control end of the second selection function unit is connected with the control bit register for USB and single-wire interface modes, and an output end of the second selection function unit outputs the bus reset signal or the USB device unplugging signal.

The second selection function unit is configured for determining the bus reset signal or the USB device unplugging signal according to the mode identification, and selecting an output signal of the USB bus reset detection module as the bus reset signal or the USB device unplugging signal in the USB mode; and selecting an output of the single-wire interface bus reset detection module as the bus reset signal or the USB device unplugging signal in the single-wire interface mode.

Figure 6:
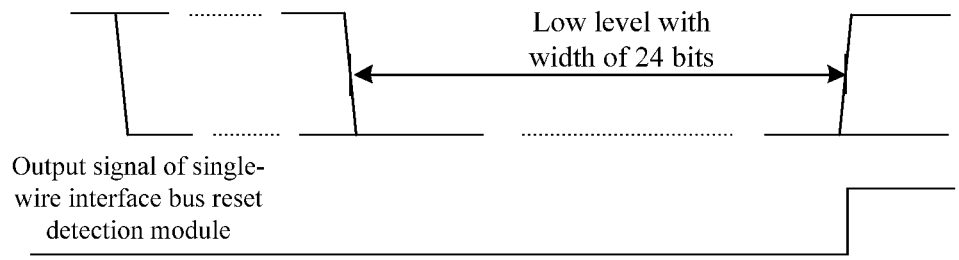
FIG. 6 shows a generation process of a valid signal of a single-wire interface bus reset detection module according to the second embodiment.

In the single-wire interface mode, when the single-wire interface bus reset detection unit detects a low level with a width of more than 24 consecutive data bits (comprising a width of 24 data bits) as shown in FIG. 6, the bus reset signal is output for a USB device function mode, and the USB device unplugging signal is output for a USB host function mode. The bus reset signal and the USB device unplugging signal are both low-frequency and low-speed signals, which theoretically do not require accurate response time. The figure is only an example, and it is not limited to whether to output the valid signal immediately after detecting a low level with sufficient width or delay several clocks before outputting the valid signal.

Third Embodiment

Figure 7:
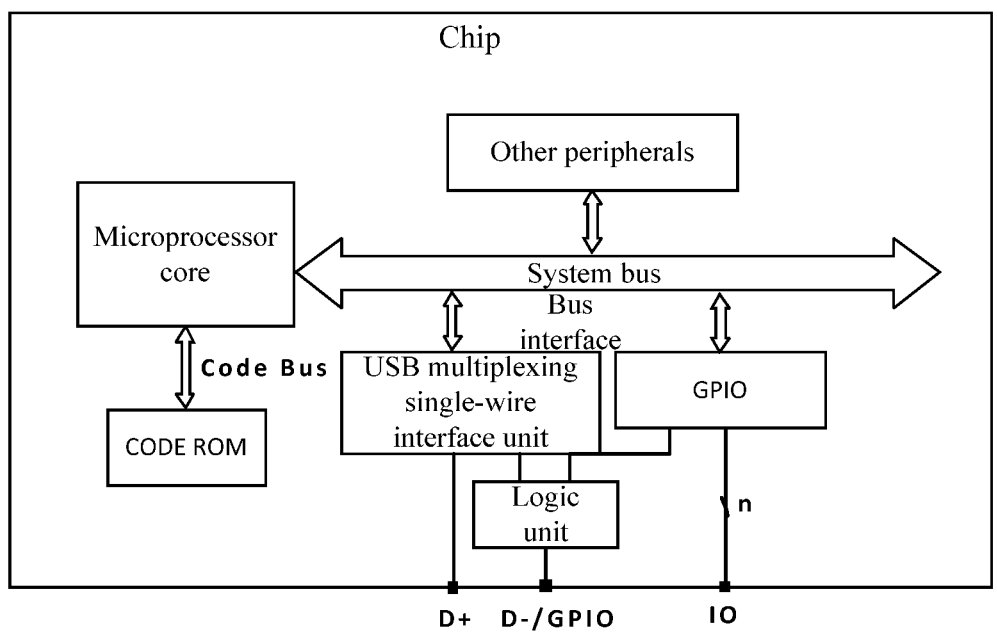
FIG. 7 is a schematic structural diagram of a chip with a built-in USB multiplexing single-wire interface unit according to a third embodiment.

The third embodiment is a chip comprising the USB multiplexing single-wire interface unit described in the first embodiment or the second embodiment. As shown in FIG. 7, in addition to the USB multiplexing single-wire interface unit, the chip further comprises a microprocessor core and a system bus, wherein the microprocessor core is connected with the system bus, and the USB controller in the USB multiplexing single-wire interface unit is connected onto the system bus. The chip also comprises other structures such as program ROM and IO pins. A logic unit may be additionally arranged. When the USB controller is in the single-wire interface mode, the logic unit selects other function module to connect the D− pin, and the original D− pin may be used for other IO purposes to save pins.

In the present invention, only the control bit register for USB and single-wire interface modes and a few circuit modules are added. Besides the classic USB mode, the single-wire interface mode is added, which can use the same protocol and the same mature software, support dynamic connection and disconnection, and support hardware CRC and retry. If the serial port and IIC interface are replaced to realize inter-chip communication, software CRC codes can be saved and USB protocol software can be shared, thus reducing the amount of program codes and saving the space and cost of the program ROM.

Fourth Embodiment

Figure 8:
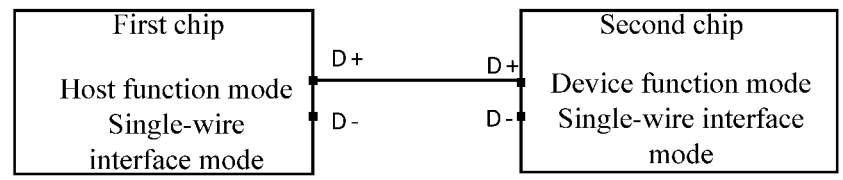
FIG. 8 is a schematic structure diagram of a communication system with two chips according to a fourth embodiment.

The fourth embodiment is a communication system comprising two chips described in the third embodiment. As shown in FIG. 8, the communication system comprises a first chip and a second chip, wherein the first chip and the second chip are both the chip described in the third embodiment, a USB controller of the first chip works in a USB host function mode, a USB controller of the second chip works in a USB device function mode, a D+ pin of the first chip is connected with a D+ pin of the second chip, and a D-pin of the first chip is not connected with a D− pin of the second chip.

Fifth Embodiment

Compared with the fourth embodiment, the fifth embodiment is different in that the communication system also comprises a third chip, a fourth chip, . . . , and an $n^{th}$ chip. When there are three or more chips in the system, it is usually necessary to add a HUB (hub or connector) to realize the communication between one chip in a host function mode and multiple chips in a device function mode. For a custom communication protocol, if a USB device address is assigned in advance, then the HUB may not be used technically.

Figure 9:
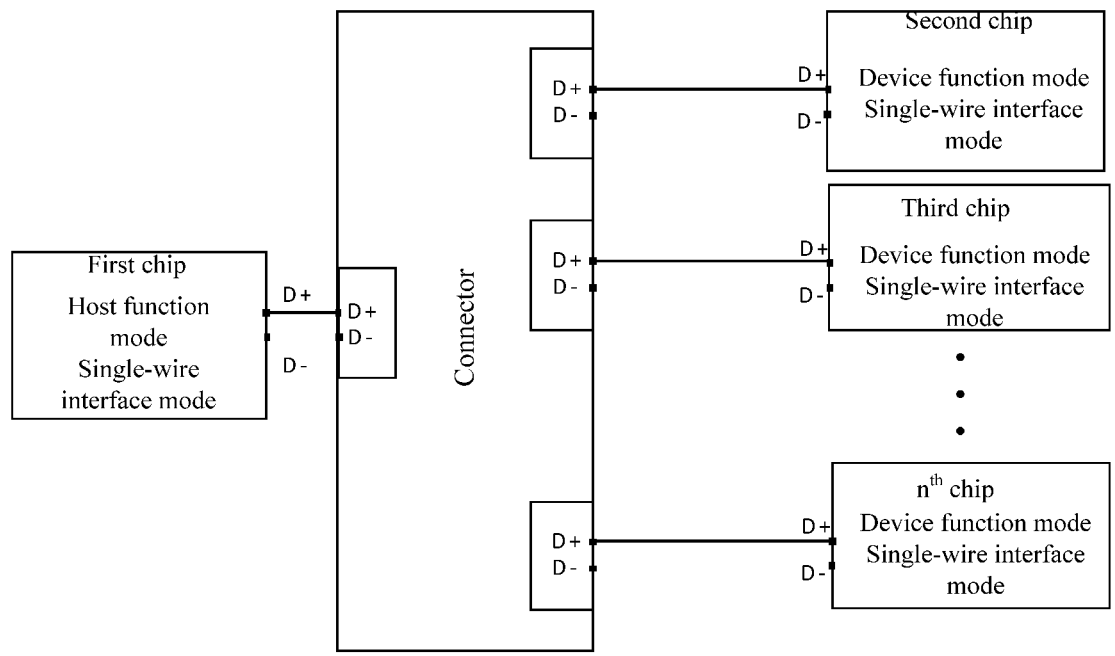
FIG. 9 is a schematic structure diagram of a communication system with multiple chips according to a fifth embodiment.

Only the D+ pins are connected between at least one chip in the device function mode and the HUB, while the D− pins are not connected. It may be that only the D+ pins of all the chips in the device function mode are connected, that is, all the chips in the device function mode are in the single-wire interface mode, as shown in FIG. 9. In this case, it is only needed to connect the D+ pins of all the chips in the host function mode.

Figure 10:
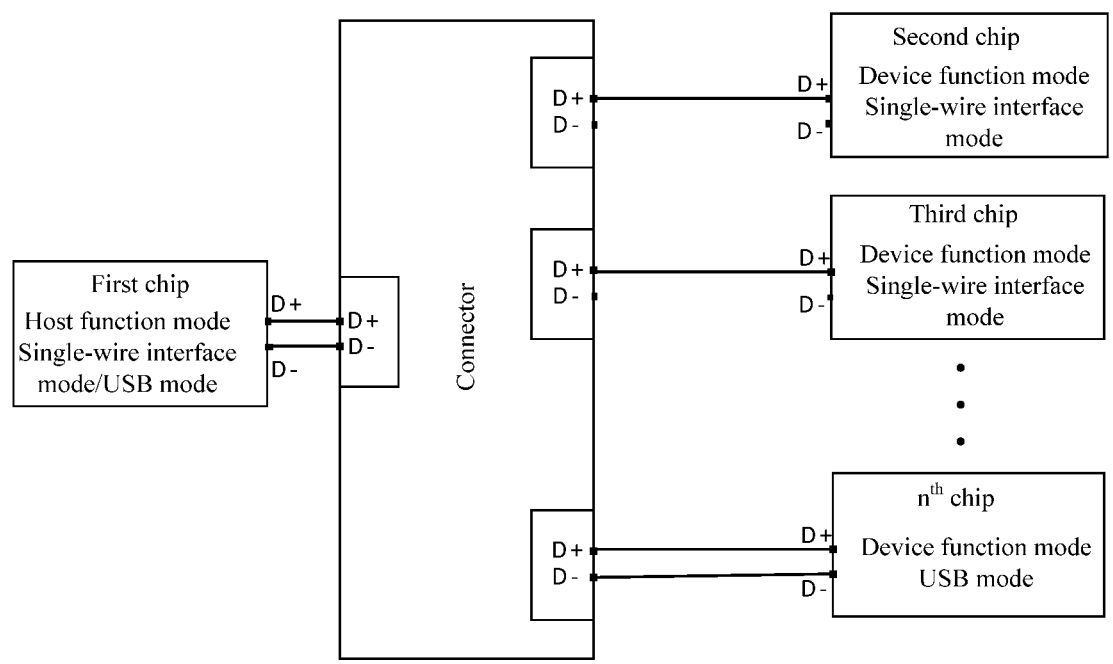
FIG. 10 is a schematic structure diagram of another communication system with multiple chips according to the fifth embodiment.

It may also be that the D+ pins and the D− pins of some chips in the device function mode are connected, while only the D+ pins of some chips in the device function mode are connected, that is, some chips in the device function mode are in the single-wire interface mode and some chips in the device function mode are in the USB mode, as shown in FIG. 10. In this case, the D+ pins and D− pins of the chips in the host function mode need to be connected.

For inter-chip communication, or communication between devices not far away from each other, the single-wire interface mode may be selected to save the chip pins. For the communication between devices far away from each other, the USB mode may be selected and a differential signal of two pins is used to communicate.

What is claimed is:

1. A USB multiplexing single-wire interface unit, comprising:
    a D+ pin and a D− pin of a USB;
    a control bit register for USB and single-wire interface modes, configured for storing mode identification, wherein the mode comprises the USB mode and the single-wire interface mode; and
    a USB controller, comprising an EOP detection module and a single-wire interface EOP detection module, wherein an input end of the EOP detection module is connected with the D+ pin and the D− pin, and an input end of the single-wire interface EOP detection module is connected with the D+ pin; and output ends of the EOP detection module and the single-wire interface EOP detection module output a USB EOP trigger signal;
    the USB controller being configured for determining the USB EOP trigger signal according to the mode identification, running the USB mode when the mode identification is the USB mode, and selecting an output of the EOP detection module as the USB EOP trigger signal, and the USB controller controlling output enable of the D+ pin and the D− pin; and running the single-wire interface mode when the mode identification is the single-wire interface mode, and selecting an output of the single-wire interface EOP detection module as the USB EOP trigger signal, and the USB controller only controlling the output enable of the D+ pin and not controlling the output enable of the D− pin.

2. The USB multiplexing single-wire interface unit according to claim 1, wherein the USB controller further comprises a USB bus reset detection module and a single-wire interface bus reset detection module, an input end of the USB bus reset detection module is connected with the D+ pin and the D− pin, and an input end of the single-wire interface bus reset detection module is connected with the D+ pin; and output ends of the USB bus reset detection module and the single-wire interface bus reset detection module output a bus reset signal or a USB device unplugging signal; and the USB controller is configured for determining the bus reset signal or the USB device unplugging signal according to the mode identification, and selecting an output signal of the USB bus reset detection module as the bus reset signal or the USB device unplugging signal in the USB mode; and selecting an output of the single-wire interface bus reset detection module as the bus reset signal or the USB device unplugging signal in the single-wire interface mode.

3. The USB multiplexing single-wire interface unit according to claim 1, wherein the single-wire interface EOP detection module outputs a valid signal when detecting that a preset signal appears in a signal of the D+ pin.

4. The USB multiplexing single-wire interface unit according to claim 3, wherein the preset signal is one or two of the following signals:

a signal comprising a token-type PID, 2 bytes of data and a low level with a width of 2 data bits in turn; and a signal comprising a high level with a width of more than 7 consecutive data bits.

5. The USB multiplexing single-wire interface unit according to claim 3, wherein the preset signal is one or two of the following signals:

a signal comprising a token-type PID, 2 bytes of data and a low level with a width of 2 data bits in turn; and a signal comprising a low level with a width of 2 data bits and a high level with a width of more than 7 consecutive data in turn.

6. The USB multiplexing single-wire interface unit according to claim 2, wherein in the single-wire interface mode, when the single-wire interface bus reset detection unit detects a low level with a width of more than 24 consecutive data bits, the bus reset signal is output for a USB device mode, and the USB device unplugging signal is output for a USB host mode.

7. The USB multiplexing single-wire interface unit according to claim 1, wherein input bit data of the USB controller to a physical layer is determined according to the mode identification, when the mode identification is the USB mode, a differential signal of the D+ pin and the D− pin is selected as input bit data of the physical layer; and when the mode identification is the single-wire interface mode, a level signal of the D+ pin is selected as the input bit data of the physical layer.

8. The USB multiplexing single-wire interface unit according to claim 1, wherein the USB controller selects the USB EOP trigger signal by a selector or a circuit equivalent to selection logic.

9. A chip, comprising the USB multiplexing single-wire interface unit according to claim 1, a microprocessor core and a system bus, wherein the microprocessor core is connected with the system bus, and the USB controller in the USB multiplexing single-wire interface unit is connected onto the system bus.

10. A communication system, comprising at least a first chip and a second chip, wherein the first chip and the second chip are both the chip according to claim 9, a USB controller of the first chip works in a USB host function mode, a USB controller of the second chip works in a USB device function mode, a D+ pin of the first chip is connected with a D+ pin of the second chip, and a D− pin of the first chip is not connected with a D− pin of the second chip.

* * * * *